March 10, 1925.  1,528,771

G. B. JACKSON

PISTON RING AND METHOD OF MAKING SAME

Filed Nov. 1, 1920

Witness:
Harry S. Gaither

Inventor:
George B. Jackson
by William H. Hall,
Atty

Patented Mar. 10, 1925.

1,528,771

UNITED STATES PATENT OFFICE.

GEORGE B. JACKSON, OF CHICAGO, ILLINOIS.

PISTON RING AND METHOD OF MAKING SAME.

Application filed November 1, 1920. Serial No. 420,979.

*To all whom it may concern:*

Be it known that I, GEORGE B. JACKSON, a citizen of the United States, and a resident of Chicago, in the county of Cook and State of Illinois, have invented certain new and useful Improvements in Piston Rings and Methods of Making Same; and I do hereby declare that the following is a full, clear, and exact description thereof, reference being had to the accompanying drawings, and to the characters of reference marked thereon, which form a part of this specification.

This invention relates to improvements in piston rings for the pistons of engines, and refers more particularly to a construction and arrangement of the parts to maintain the ring pressed outwardly against the cylinder during the operation of the engine. The invention also relates to a novel process of making such rings.

A piston ring embodying my invention is made up of two metals having different coefficients of expansion, so arranged that the heat set up by the operation of the engine operates on one of the members to cause it to expand, and by its connection with the other, or wearing member, to cause the latter to be forced outwardly against the cylinder wall. The outer member may be made of any suitable hard wearing material for direct contact with the cylinder wall, such, for instance, as cast metal, steel, or any metal compound suitable for the purpose. The inner member lies against the inner face of the wearing member and is made integral therewith. This inner member is made of a metal which possesses a higher coefficient of expansion than the wearing member, so that when it is heated it expands or enlarges and thereby forces the wearing member, which is suitably split in any well known manner at one or more points, against the wall of the cylinder.

In practice, the wearing member may be made of cast metal which is finished at its outer face for contact with the cylinder wall and is split or transversely divided at one or more points, so that the ring can open away from its groove in the piston against the cylinder wall, and the inner member may be made of such material as copper or the like and which possesses a higher coefficient of expansion than the metal of the outer member or ring. This inner or expanding member will also be transversely cut or split along the line or lines which the wearing member of the ring is cut.

The said inner or expansion member of the piston ring is formed on the ring by an electro-plating operation, the metal being deposited on the inner side of the ring in the well known manner of electro-plating.

In producing piston rings in accordance with my novel process, a pipe of suitable material and of considerably greater length than the length of each ultimate piston ring may be plated on its inner surface, by a suitable plating process, with a layer of the expanding material of such thickness relatively to the wearing member and also relatively to the resiliency of the two members of the rings, as to insure sufficient power, when the rings are completed for the expanding metal of the inner surface thereof to force or expand the wearing member against the cylinder. Thereafter the pipe can be sawed or otherwise parted transversely at intervals to produce the proper length or depth of the piston ring, such transverse division of the duplex pipe being, of course, through both of the metals. Thereafter the solid rings thus produced are suitably finished and are transversely cut in any well known manner of dividing piston rings to permit expansion thereof. When using cast iron as the wearing member and copper as the expanding member, the copper layer or member will, in practice, constitute about one quarter of the thickness of the dual ring body. In practice, when the metal of a higher coefficient of expansion is applied to the wearing member by a plating process, the pipe from which the dual metal rings are made can be set on end and closed at its lower end and filled with a suitable electrolyte preparatory to the usual plating operation.

First, referring to Figures 1, 2, and 3, 10 designates the outer or wearing member of the ring and 11 designates the inner or expansion member of the ring. As herein shown, the completed ring, made up of the two parts 11 and 12, is diagonally divided at 12 to produce a known overlapping or scarfed joint which permits the piston ring to open. Said overlapping joint, however, may be made in many other known ways, and this feature constitutes in itself no part of the present invention.

Figure 1:
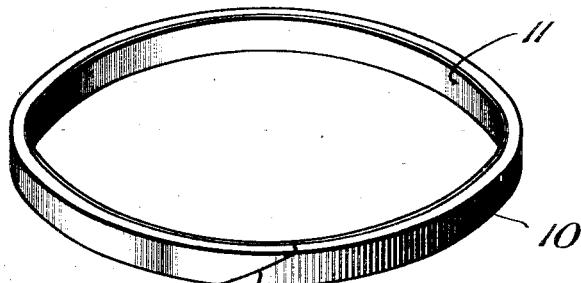
Figure 1 is a perspective view of a piston ring embodying my invention.
Figure 2:
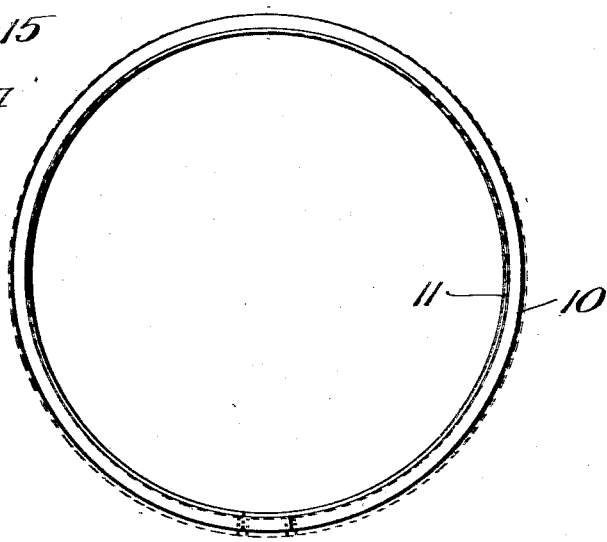
Figure 2 is a plan view thereof, showing in full and dotted lines the closed and expanded positions of the ring, respectively.
Figure 3:
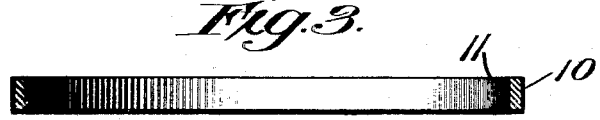
Figure 3 is an axial section of the ring.

The piston ring shown in Figures 1, 2, and 3 is of that type wherein the inner or expansion member 11 is plated on the inner surface of the wearing member. The said expansion member is shown in Figure 3 as being made about one-quarter of the total thickness of the ring body but, as stated, the relative thicknesses of the two ring members will depend upon their relative coefficients of expansion and their resiliency, it being only necessary that the normal temperature of the engine in which the piston ring is used will be such as to cause the inner expansion member to expand sufficiently to force the outer wearing member closely against the cylinder.

Figure 4:
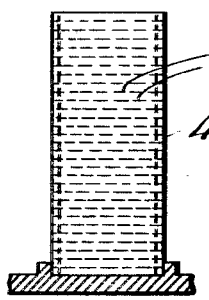
Figure 4 is a side elevation on a smaller scale of a pipe from which the rings can be cut, indicating in dotted lines the lines of severance of the pipe to produce the rings.

Figure 4 illustrates a pipe 14 from which the dual member rings may be conveniently produced. In producing a ring in accordance with the novel process said pipe is set up in a vertical position and is closed liquid tight at its lower end so as to hold the electrolyte poured therein preparatory to the plating operation. The dotted lines 15 on Figure 4 indicate the lines at which the tube or pipe is transversely parted, as by means of sawing, to produce the individual member rings.

The detail of the plating apparatus is not herein shown, it being understood that any known or special form of apparatus may be employed for this purpose.

An advantage of the piston ring described is that the ring is thermally forced into working position against the cylinder by the reaction of the expansion member 11 under the usual temperature of the engine, thereby avoiding the necessity of using springs between the piston ring and the bottom of the groove in the piston which receives the same, and also avoiding the necessity of using high grade resilient metal wherein the resiliency of the metal itself is depended upon to hold the wearing face of the ring outwardly against the cylinder wall.

Another object of the construction shown, is the low cost at which the piston rings may be made as compared to prior piston ring constructions, this low cost being due, in part, to the reduced machine operations required in the usual known piston rings. Moreover, the piston ring, when completed, is a solid or unitary or integral structure, so that there is no liability of separate parts becoming detached or lost when applying the ring to or removing it from the piston. Moreover, by reason of the unitary or integral structure of the ring, the ring may be more readily applied to the piston and at an expense of less time as compared to prior piston rings.

While the member 10 has been referred to as the wearing member, it will be understood that it possesses the usual thermal expansion of whatever metal may be employed but that the inner, and what may be termed the thermally expanding member, is one made of a metal having a higher coefficient of expansion than the wearing member.

I claim as my invention:

1. A divided, dual piston ring comprising an outer element having an outer wearing face and an inner expansion element plated to the inner face of said outer element.

2. The method of making piston rings which comprises the steps of plating the inner surface of a wear member with a metal having a relatively higher co-efficient of expansion and dividing the ring to produce an expansion joint.

3. The method of making piston rings which comprises the steps of fixedly securing to the inner surface of a pipe a metal having a higher coefficient of expansion than the material of the pipe, parting said pipe at right angles to its axis in short sections, and finally dividing the dual ring members thus made to produce expansion joints.

4. The method of making piston rings which comprises the steps of plating the inner surface of a metal pipe with a metal having a higher coefficient of expansion than the material of the pipe, thereafter severing or parting the pipe to produce short sections, and finally dividing each section to produce expansion joints.

5. The method of making piston rings which comprises the steps of plating the inner surface of the wear member of the ring with a metal having a higher coefficient of expansion under heat than said wear member and dividing the dual ring.

In witness whereof I claim the foregoing as my invention, I hereunto append my signature this 28th day of October, 1920.

GEORGE B. JACKSON.